United States Patent [19]

Rumbolt et al.

[11] Patent Number: 4,703,359

[45] Date of Patent: Oct. 27, 1987

[54] UNIVERSAL REMOTE CONTROL UNIT WITH MODEL IDENTIFICATION CAPABILITY

[75] Inventors: Robin B. Rumbolt; William R. McIntyre, both of Knoxville; Larry E. Goodson, Blaine, all of Tenn.

[73] Assignee: NAP Consumer Electronics Corp., New York, N.Y.

[21] Appl. No.: 799,873

[22] Filed: Nov. 20, 1985

Related U.S. Application Data

[63] Continuation-in-part of Ser. No. 739,357, May 30, 1985.

[51] Int. Cl.⁴ ............................................. H04N 5/44
[52] U.S. Cl. .................................. 358/194.1; 455/603; 340/825.69; 340/825.72
[58] Field of Search ...................... 358/194.1; 455/603, 455/352; 340/825.69, 825.71, 825.72, 825.73

[56] References Cited

U.S. PATENT DOCUMENTS

| | | | |
|---|---|---|---|
| 4,274,082 | 6/1981 | Litz et al. ......................... | 455/352 X |
| 4,334,221 | 6/1982 | Rosenhagen et al. ...... | 340/825.69 X |
| 4,386,436 | 5/1983 | Kocher et al. ....................... | 455/151 |
| 4,482,947 | 11/1984 | Zato et al. ..................... | 358/194.1 X |
| 4,535,333 | 8/1985 | Twardowski .............. | 340/825.72 X |
| 4,623,887 | 11/1986 | Welles, II .................. | 340/825.72 X |
| 4,626,848 | 12/1986 | Ehlers ........................... | 358/194.1 X |

FOREIGN PATENT DOCUMENTS

| | | | |
|---|---|---|---|
| 3338046 | 10/1984 | Fed. Rep. of Germany ...... | 455/603 |
| 3313493 | 10/1984 | Fed. Rep. of Germany ...... | 455/603 |

Primary Examiner—Michael A. Masinick
Assistant Examiner—E. Anne Totz
Attorney, Agent, or Firm—Thomas A. Briody; William J. Streeter; Marianne R. Rich

[57] ABSTRACT

A remote control unit responds to activation of a "identify" button by transmitting a sequence of command signals, each of the same command in a different format. Since the appliance to be controlled is turned on, it responds in a predetermined way (e.g. a channel change) when it receives the properly formatted command. The user then terminates the learn mode and a pointer denoting the address of the last transmitted command, i.e. the properly formatted command, is stored in the unit and used as part of the address for reading data for subsequent user-selected commands out of memory.

13 Claims, 6 Drawing Figures

UNIVERSAL REMOTE CONTROL UNIT WITH MODEL IDENTIFICATION CAPABILITY

CROSS-REFERENCE TO RELATED APPLICATIONS:

The present application is a continuation-in-part of the application entitled "Universal Remote Control Unit", Ser. No. 739,357, filed May 30, 1985, inventors Robin Rumbolt and William McIntyre, and assigned to the same assignee. The parent application is hereby incorporated by reference into the present application.

FIELD OF THE INVENTION

The present invention relates to remote control units and, particularly, to remote control units for controlling home appliances to carry out selected operations.

BACKGROUND OF THE INVENTION

At present, many home appliances are available which can be remotely controlled by the user. For example, a television set can be turned on and off, a channel can be selected, a video cassette recorder controlled to play or record, etc. However, each manufacturer effects this control differently. The bit pattern required to carry out a given operation differs for different manufacturers. Similarly, the basic format, such as the bit timing, the number of bits per word, the width of the pulses, the modulating frequency, if any, applied to each pulse, the presence of, length of, and format of start, lead, or trailer pulses and the number of correct receptions of a particular command required to activate the appliance to carry out the selected operation varies from manufacturer to manufacturer. The basic format may also be different for different model numbers of the same manufacturer.

Further, control of, for example, a video cassette recorder frequently requires the ability to control a related appliance, e.g. a television set, in conjunction therewith. At present, viewing a recorded program requires use of two individual remote control units, particularly if the recorder and the television set are not made by the same manufacturer. If the home is equipped with cable television, or if other appliances such as, for example, an oven can be remotely controlled, the number of required remote control transmitters becomes excessive. In addition, each time the user replaces an appliance the old remote control unit becomes obsolete and a new one must be bought.

SUMMARY OF THE INVENTION

It is an object of the present invention to furnish a universal remote control unit which allows control of different types of appliances as well as appliances manufactured by different manufacturers.

The remote control unit is to be simple to operate, light, reliable, and relatively inexpensive. Particularly, it is to be able to "identify" a command signal structure, including bit pattern and format, required to control a specific appliance with minimal effort on the user's part and within a short time. The identified signal structure is to be retained until the user reinitiates the "identify" mode, so that no model number and/or manufacturer selection by the user is required for normal operation of the unit.

In accordance with the present invention, the user sets the appliance to be controlled by the remote control unit to execute some observable action when receiving a specific command signal, herein referred to as a response-evoking signal, having the required signal structure. For example, if the appliance is a television set, the observable action may be a channel change, i.e. the response-evoking signal would be a "channel up" signal.

The user then activates a selector device such as a keyboard to put the remote control unit into the "identify" mode. The microprocessor within the unit then executes an "identify" program. In the course of execution of the "identify" program, the unit transmits response command signals (e.g. channel up signals) in a variety of signal structures appropriate for different manufacturers and different model numbers. The appliance will react to the one of the response command signals which has the required signal structure.

In response to the observable action, the transmitting of response command signals is terminated. The last transmitted one of the response command signals then has the required signal structure. Data identifying this signal structure is stored in the remote control unit, and subsequent user activated commands for the appliance are generated in part in dependence on the so-stored data.

In a presently preferred embodiment, the user holds down the keyboard "identify" button or buttons until the appliance executes the observable action. When the user notes that the appliance has reacted to the command, the button is released and data identifying the required signal structure is stored. Thereafter, any command entered by the user will be carried out with the signal structure required by the particular model for that command.

In a particularly preferred embodiment, the stored signal structure identification data constitutes part of an address, the remainder of the address being provided by user selection of the category to which the appliance belongs.

The above-mentioned address is used to address one table in a multiplicity of product code tables. The information from the table is then combined with keyboard data to address the formatter which in turn activates the infrared transmitter.

The present invention, as well as additional objects thereof, will be better understood upon reference to the following description taken in connection with the accompanying drawing.

DESCRIPTION OF THE PREFERRED EMBODIMENTS

The present invention is disclosed herein as part of the remote control unit described in the copending application, Ser. No. 739,357, which is herein incorporated by reference. Only the parts of the disclosure of the parent application which are required for understanding the present invention will be illustrated below. While the so described apparatus constitutes a preferred embodiment, the present invention is also useable with other types of remote control units.

Figure 1:
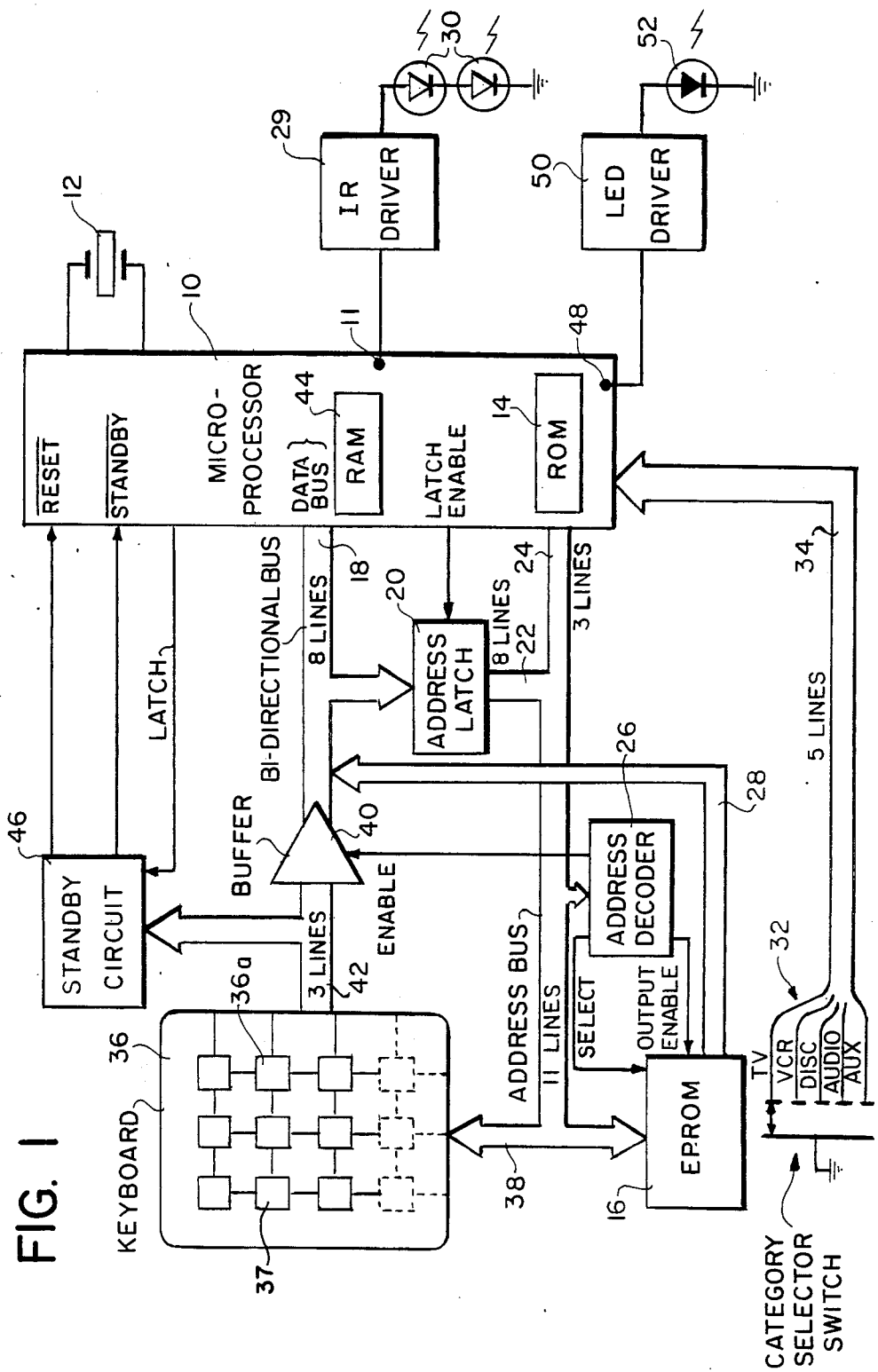
FIG. 1 is a block diagram of a remote control unit and associated apparatus according to the present invention.

Referring now to the drawing, in FIG. 1, a microprocessor, which is the central control unit for the system, is denoted by reference numeral 10. The timing of microprocessor 10 is controlled by a crystal time base 12. In normal operation, microprocessor 10 receives data from two user controlled selector devices described in detail below and from a memory storing signal structure identification data. This data is utilized by a "decode" program located in an internal ROM 14 of microprocessor 10 to calculate an address for an electrically programmable read only memory (EPROM) 16 separate from microprocessor 10. It could equally well be an EEPROM or a ROM and internal rather than external to microprocessor 10. The generated address is then put out on a two-way, eight line bus 18 and an address latch 20 is enabled. The address is stored in latch 20 and, subsequently, as timed by microprocessor 10, the address from latch 20 is applied to an eight line bus 22, and combined with the signal on three lines 24 emanating from microprocessor 10. The combined address is applied to an address decoder 26 as well as EPROM 16. Address decoder 26 first enables a "select" line and, thereafter, an "output enable" line for EPROM 16, again under microprocessor control. Data from EPROM 16 is transmitted through an eight line bus 28 and bus 18 back to microprocessor 10. The data from EPROM 16, also referred to as formatter instruction or signal structure data, is then used within microprocessor 10 to energize an infrared transmission drive circuit 29 so that infra-red light emitting diodes 30 transmit signals with a corresponding signal structure, i.e. bit pattern and signal format. The transmitted infrared radiation is received by the appliance and causes it to operate as desired by the user.

It should be noted herein that the word "format" as used herein refers to parameters such as pulse width, frequency, number of bits per word, modulating frequency, if any, applied to each pulse, the presence of, length of, and shape of start, lead or trailer pulses and the number of correct receptions of a particular command required to activate the appliance to carry out the selected operation. Other parameters can be added if required, and nonrelevant parameters can be omitted depending upon the particular appliances to be controlled.

In a preferred embodiment, the microprocessor is a Hitachi HD6301 operated in mode 6 with an oscillator frequency of 4 MHz and an instruction cycle time of 1 microsecond. This speed is necessary in order to generate the carrier output frequencies of up to 55 KHz required by some IR control systems.

The first of the user-operated selector devices is a category selector switch 32, by which the user selects the category of the appliance which is to be controlled. Its output is connected to microprocessor 10 through five lines 34, the selected line being grounded. A set of category bits signifying the user-selected category is stored in a random access memory (RAM) 44 in microprocessor 10. In the example illustrated in FIG. 1, the following categories are provided: a television receiver (TV), a video cassette recorder (VCR), a disc player (disc), an audio system (audio), and an auxiliary input (aux) suitable, for example, for controlling a cable converter.

The second selector device is a keyboard 36. In the preferred embodiment, keyboard 36 is a 3×11 matrix of keys 36a, addressable by 11 address lines of a bus 38. Bus 38 is constituted by eight line bus 22 and three line bus 24. During a keyboard scan, address decoder 26 enables a buffer 40, and each of the eleven columns is energized in turn by microprocessor 10 via bus 38. An output is obtained on the one of the three output lines 42 connected to an energized column by a user-depressed key. This output is then transmitted through buffer 40 and bus 18 to microprocessor 10. There, the result of the keyboard scan is stored in RAM 44. It should be that keyboard 36 has an "identify" key 37 in addition to keys such as "volume up", "channel up", "channel down", etc. of a conventional remote control unit.

The memory storing the "identified" address or pointer and the category bits is also RAM 44. As illustrated in FIG. 1, RAM 44 is internal to microprocessor 10. An external memory could be used equally well.

EPROM 16 contains product code (specific device) look-up tables indexed by the category selector bits and signal structure identification data stored in RAM 44.

A product code is read out from EPROM 16 and combined with the key data to form an address for a command table also stored in EPROM 16.

The data read out from the command tables, namely a command code, is then passed to the appropriate IR transmitter routine, called a formatter, also stored in EPROM 16. Each formatter has a device specific program designed to generate the precise carrier frequency, pulse width, pulse modulation and overall timing format required by the particular device to be controlled.

The data output lines from keyboard 36 are also connected to the inputs of a stand-by circuit 46. A first and second output of stand-by circuit 46 is connected to a reset and stand-by input of microprocessor 10, respectively.

Standby circuit 46 was illustrated in greater detail in co-pending U.S. application Ser. No. 739,357. Its description will not be repeated here since it is not essential for an understanding of the present invention.

Finally, an output port 11 of microprocessor 10 is connected to IR drive circuit 29 which in turn drives infrared light emitting diodes (LED's) 30. An additional output port 48 is connected to an "identify" drive circuit 50 driving an LED 52 emitting visible red light.

Figure 2:
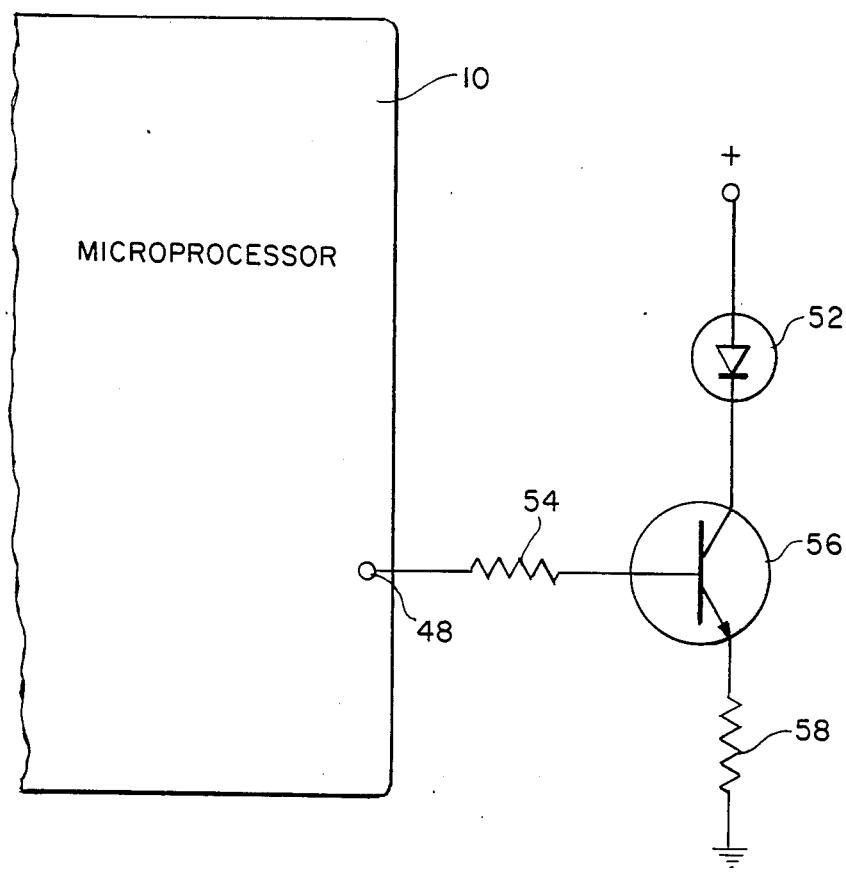
FIG. 2 is a schematic diagram of the "identify" mode indicator circuit.

FIG. 2 is a schematic diagram of the drive circuit and the "identify" light emitting diode. Microprocessor 10 has an output terminal 48 which is connected to a resistor 54 to the base of a transistor 56. The emitter of transistor 56 is connected to ground potential through a resistor 58. The collector of transistor 56 is connected through light emitting diode 52 to positive potential. When a positive voltage is applied to terminal 48, transistor 56 becomes conductive and light is emitted by light emitting diode 52.

Operation of the above-described equipment, with particular emphasis on the "identify" mode, will now be described with reference to the flow charts of FIGS. 3, 4, 5.

However, it should be noted that the user must turn on the device to be controlled and set it (if necessary) so that it is ready to carry out a specified observable action (e.g. channel change) upon receipt of a correctly structured response command (e.g. "channel up") before the "identifying" process can begin.

Figure 3:
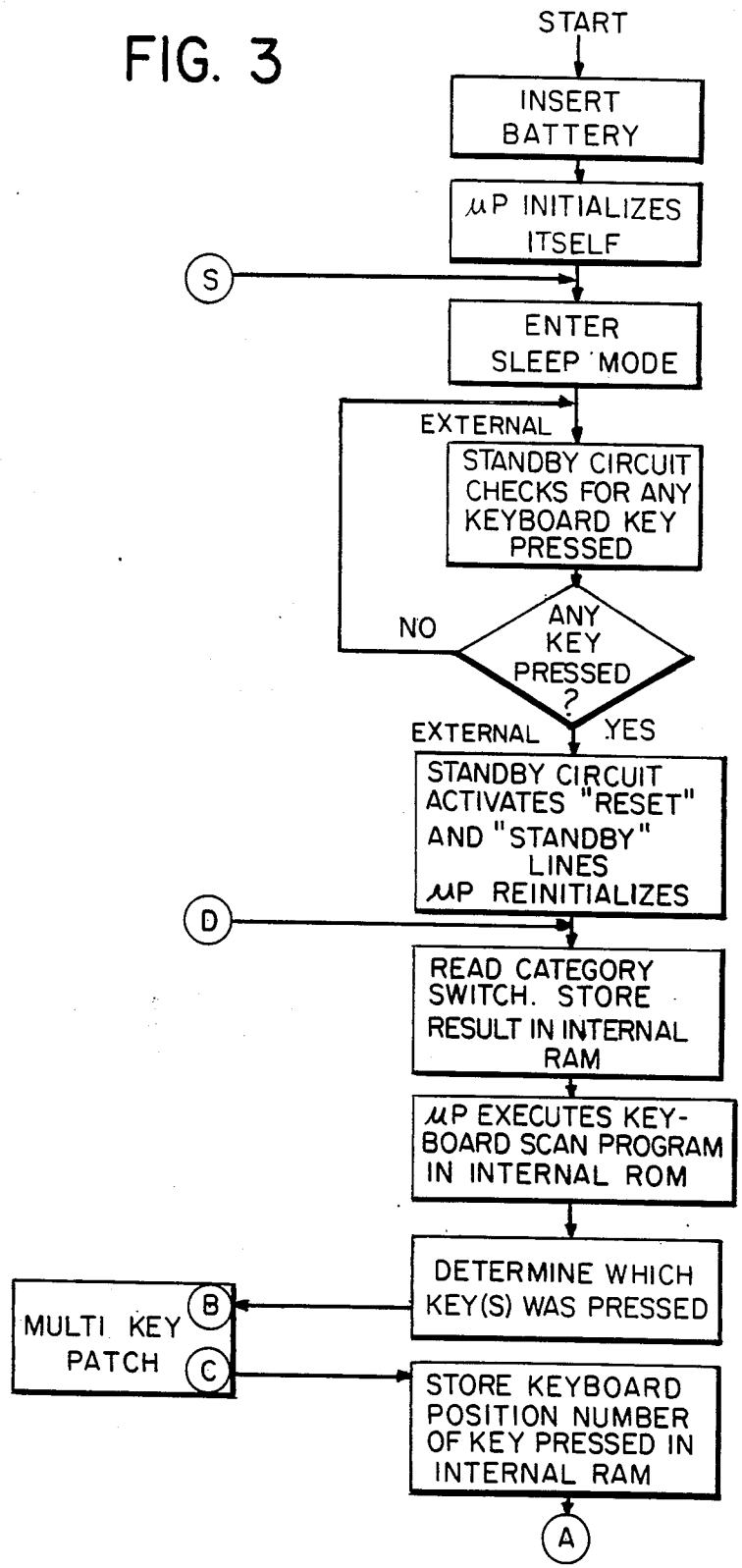
FIG. 3 is a flow chart of the main microprocessor program.

Referring now to FIG. 3, upon insertion of the battery, microprocessor initialization takes place. RAM 44, the input-output ports, and a flag in the internal memory of the microprocessor are set to initial conditions. Data in RAM 44 is set to address the first entry in each table in EPROM 16. The microprocessor then enters the sleep mode. In this mode, stand-by circuit 46 grounds the reset and stand-by pins of the microprocessor. A circuit internal to the microprocessor shuts down all internal circuitry except for memory and the circuitry monitoring the "stand-by" and "reset" lines. This state continues until a key of keyboard 36 is pressed.

Upon pressing of a key, the "reset" and "stand-by" circuits in microprocessor 10 are energized. Monitoring of the stand-by and reset lines as well as the previously set flag causes the microprocessor to energize the latch for stand-by circuit 46 and to enable address latch 20.

The microprocessor then executes a keyboard scan program stored in ROM 14 via bus 38. If a key on keyboard 36 is pressed, one of the keyboard rows is connected to its column, causing one of the lines of bus 42 to be at a high level at a specific step in the program. This information is utilized by a program in ROM 14 to determine the position number of any pressed key.

Figure 4:
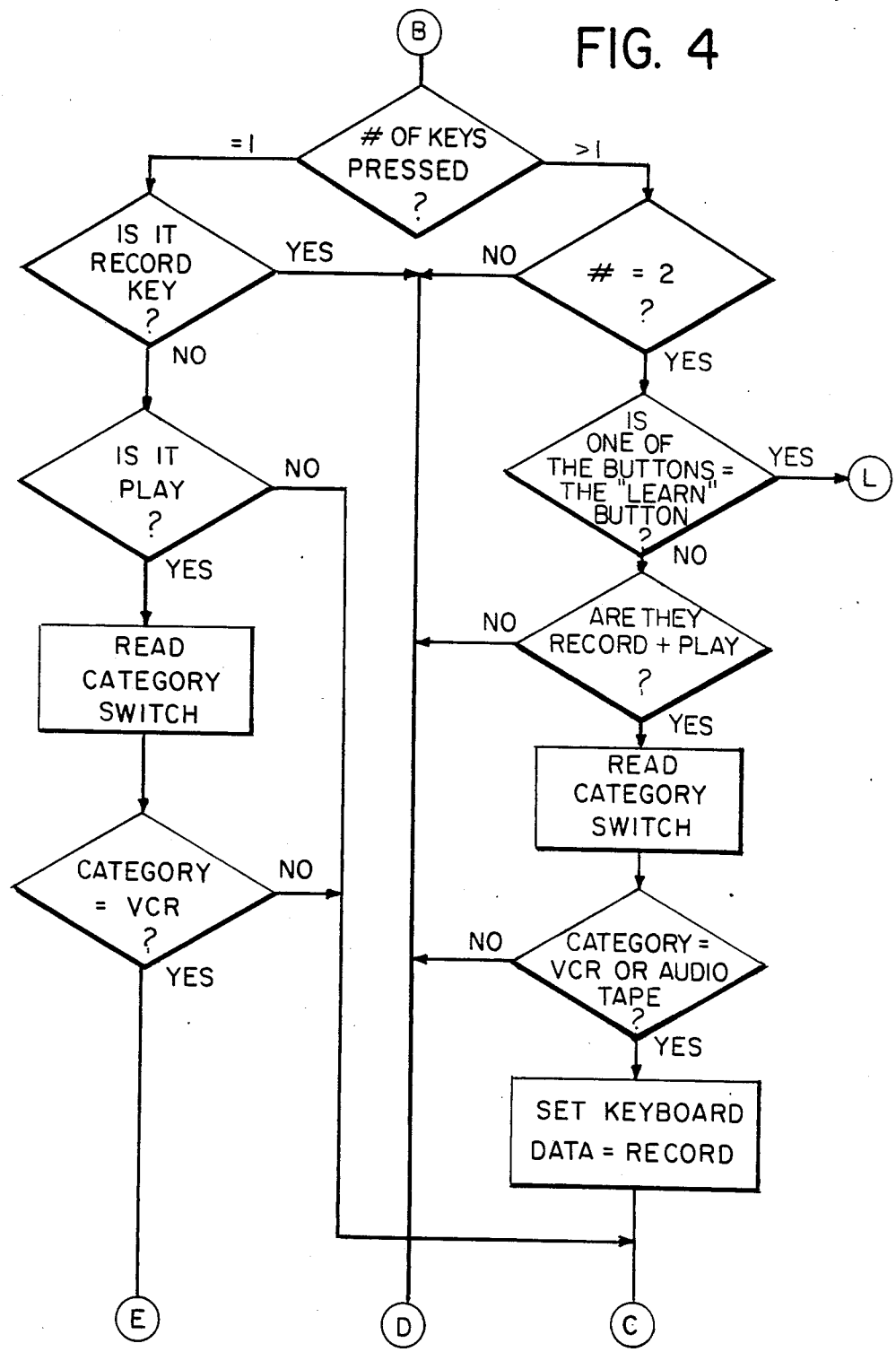
FIG. 4 is a flow chart of the multi-key program.
Figure 5:
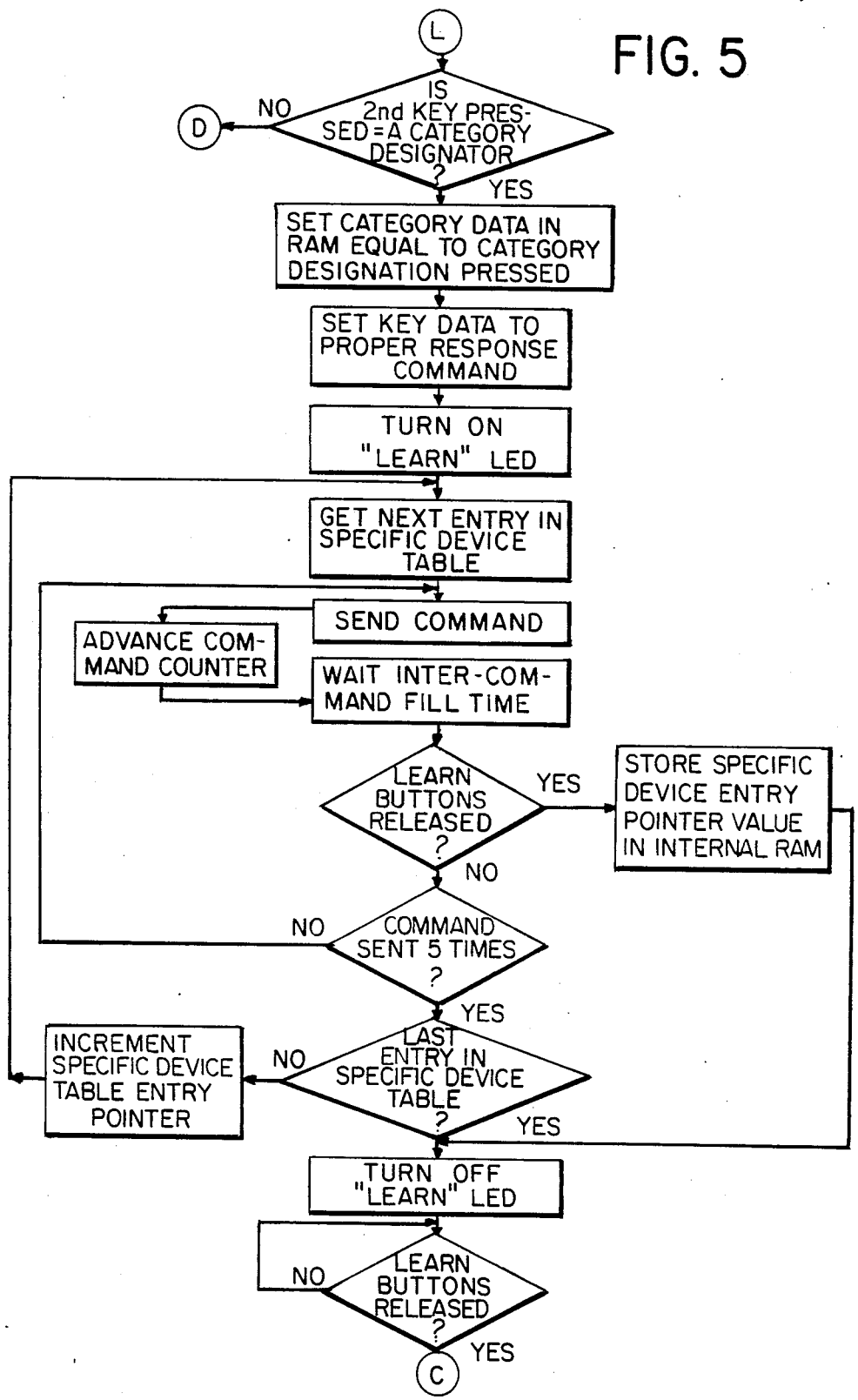
FIG. 5 is the flow chart for the identify program.

The microprocessor then enters the multi-key patch subroutine shown in FIG. 4. Specifically, it is first determined whether the number of keys pressed is equal to 1 or greater than 1. If the number is greater than 1, it is determined whether the number is equal to 2. If the number is not equal to 2, i.e. if more than 2 keys have been pressed, an unacceptable condition prevails and the program is aborted, a new scanning of the keyboard being initiated.

If two keys have been pressed, it is determined whether one of these is the "identify" button. If so, the program exits to the "identify" mode illustrated in the flow chart of FIG. 5.

In the identify mode, it is first determined whether the second key pressed is a category designator, i.e. the program checks to see whether the two key combination is the "identify" key plus either the television, or VCR, or disc key, etc. If this is not case, the program aborts, but the keyboard scan is continued.

If the second key pressed is a key designating a category, the category data in RAM 44 is set equal to the category designation pressed on the keyboard. This category number, plus a specific device table pointer (stored signal structure identification data) also stored in RAM 44 together form an address used to access the product code tables in EPROM 16.

Next, the key data section of RAM 44 is automatically set to the predetermined response command. This command is a command which will cause some readily observable action to occur at the appliance to be controlled. For TV, VCR, and cable converter, the channel up command is used. For disc, the command used is play, while for an audio unit a station advance command would be used.

Microprocessor port 48 is then turned high so that transistor 56 (FIG. 2) becomes conductive and red light emitting diode 52 is energized. The user thus knows that the equipment is in the "identify" mode.

At this point the data stored in RAM 44 includes the selected category bits and key data signifying the predetermined response command. The category bit data, together with a specific device pointer identifying the first product code in a product code table in EPROM 16 is then used to address EPROM 16. For each addressed product code, i.e. each entry in the product code table, the following information is stored:

1. The address of the formatter, i.e. the address of the location in EPROM 16 where data specifying the format required to control the device identified by the product code is stored;
2. The address of the relevant command table; and
3. An intercommand fill time delay value.

This information is transferred to internal RAM 44 of microprocessor 10.

The product code information from EPROM 16 is combined with the key data in RAM 44 to access the predetermined response command in the command tables in EPROM 32. The command data is passed to the formatter.

Next, microprocessor 10 sends the command, i.e. IR drive circuit 29 is energized, and the desired command is sent in the appropriate format by proper energization of IR LED's 30. Additionally, a command counter is advanced by one count. The equipment then waits for the intercommand fill time to give the user a chance to respond. Specifically, the user must release the "identify" button if, in response to the command, the controlled appliance has carried out the particular command, e.g. the channel has been switched on a television set.

The equipment then tests whether the identify button has been released. If not, the command counter is tested to see whether the command has been sent an appropriate number of times, for example five times. If not, the sending of the command is re-commenced. If the command has been sent five times, a further test is carried out whether the last entry in the product code table has been reached. If it has not been reached, the stored specific device pointer in RAM 44 is advanced by one increment and the cycle re-commences for the next product code in EPROM 16.

If the last entry in the product code table has been reached, the red indicator light (FIG. 2) is turned off. This indicates to the user that the unit cannot be used to control this particular device.

If the "identify" button has been released, the pointer value identifying the signal structure which resulted in release of the "identify" button is stored in internal RAM 44 of the microprocessor and the red light is turned off. There is a final test to see whether the identify button has been released and as soon as this is the case, the program exits from the identify sub-routine. Data determining the required address to retrieve the proper product code from EPROM 16 is now available in RAM 44 for the particular category for which the "identify" routine was completed.

It should be noted that in the above embodiment the term "category" referred to different types of appliances, such as VCR's or TV's. The term "category" as used herein, however, also includes categories such as "first television" and "second television", i.e. the same type of appliance but a different model and/or manufacturer.

Figure 6:
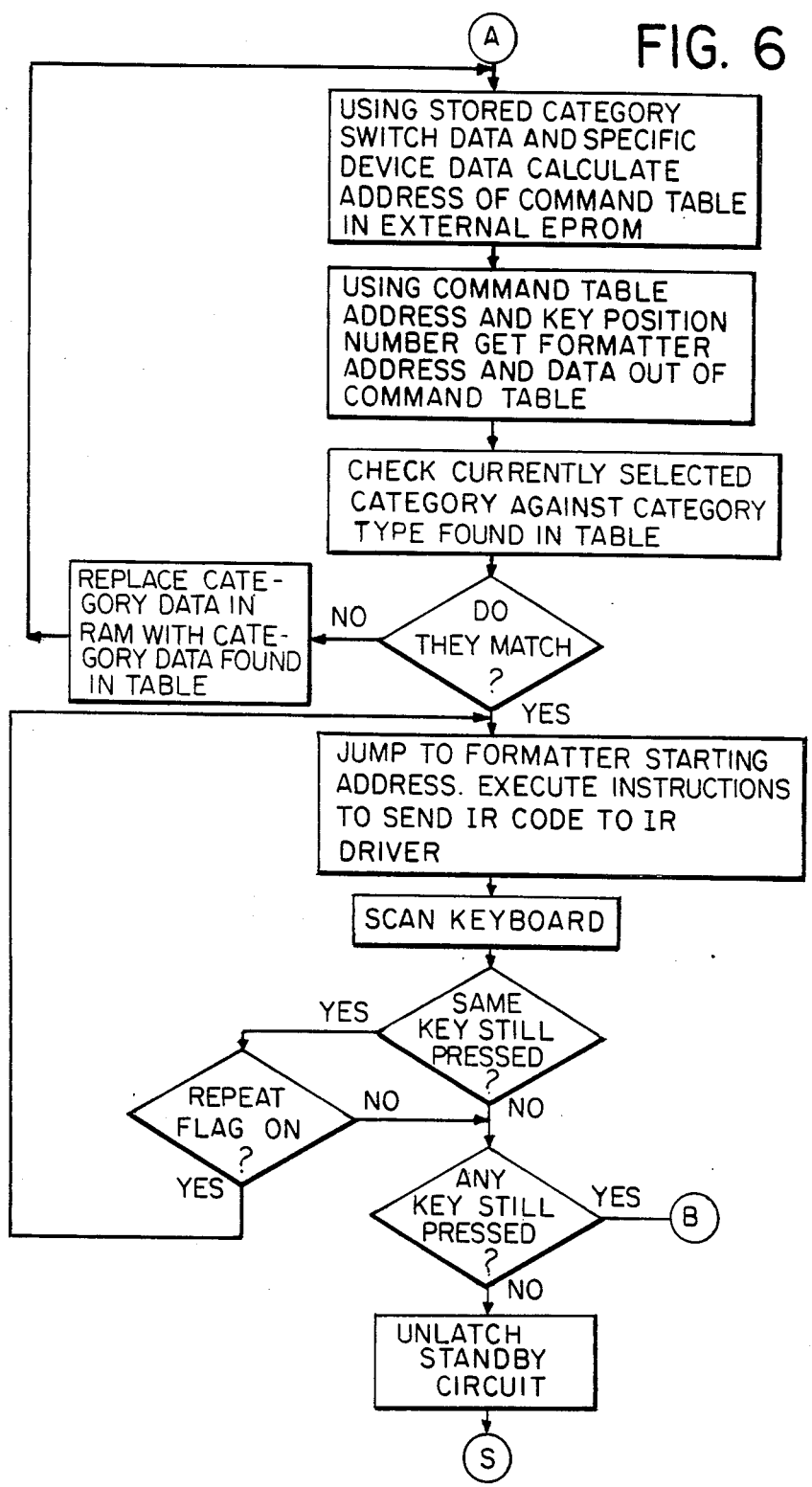
FIG. 6 is the flow chart for the transmit program of the present invention.

After the program exits from the identify mode, it returns to the main program at the point where the key data is entered into internal RAM. (See FIG. 3.) After the key data has been entered, the "send" mode, FIG. 6, commences.

In the send mode, the "decode" program in internal ROM 14 of microprocessor 10 uses the stored category data and stored signal structure identification data (specific device pointer) to calculate the address of the command table in EPROM 16. The command table stores the following data for each key position:
1. The command word bit pattern
2. The formatter starting address
3. A repeating/not repeating flag
4. Category type The command table address calculated by the decode program is then combined with the stored key data to read out the above data from EPROM 16. A comparison of the selected category type stored in RAM 44 and the category type found in the command table is carried out. If the two do not match, the category data in RAM is replaced with the category data found in the table. The program then reenters the decode program. This category matching step is required for use of commands in other categories from the one selected (e.g. T.V. volume up with VCR category selected). Since this process is explained in the parent case and is not required for understanding the present invention, no further explanation will be given here.

If a match in the category data has been found, the program jumps to the formatter starting address. Instructions are executed to send infrared code to the infrared driver. In other words, the formatter instructions stored in EPROM 16 cause the microprocessor to send the command word bit pattern to the IR driver in the format (carrier frequency, pulse type, timing, etc.) appropriate for the controlled appliance.

A renewed keyboard scan is then carried out. It is determined whether the same key is still pressed. If so, it is further tested whether the repeat flag is on. If the repeat flag is on, the program returns to the formatter starting address and the transmitter repeats sending the previously sent code.

If the same key is no longer pressed, it is determined whether any key is still pressed. If so, the program exits to the multi-key program illustrated in FIG. 4. If not, the standby circuit is unlatched and the main program is reentered as illustrated in FIG. 3.

The method and apparatus of the present invention, as described above, allow a light, hand-held remote control unit to "identify" which of a number of signal structures stored in its memory is appropriate for a given device to be controlled. If the data stored in memory included all appliances for each category, the control unit would be completely "universal". Using present state of the art technology, this is impossible. However, the data stored in memory includes the appropriate formats for the most widely used appliances and it is possible to provide space and connections for additional memory should this be required in exceptional cases.

Although the invention has been illustrated in a particular preferred embodiment, it is not intended to be limited thereto. Many variations in operation and construction will readily occur to one skilled in the art and are intended to be encompassed in the invention as set forth in the following claims.

We claim:

1. Method for adapting a remote control unit to generate appliance command signals having a required signal structure for controlling a selected one of a plurality of appliances of different categories and different manufacturers, each appliance being responsive to a different signal structure, comprising the steps of:

generating a selected category signal signifying the category of said selected one of said plurality of appliance under user control;

setting said selected appliance to execute a predetermined action upon receipt of a response-evoking signal having said required signal structure;

transmitting in sequence a plurality of response command signals each commanding said predetermined action in a different signal structure until said selected appliance executes said predetermined action, whereby the last-transmitted one of said response command signals constitutes said response-evoking signal having said required signal structure;

storing signal structure identification data corresponding to said required signal structure of said response-evoking signal, thereby creating stored signal structure identification data; and generating subsequent appliance command signals at least in part under control of said selected category signal and said stored signal structure identification data.

2. A method as set forth in claim 1, further comprising the steps of generating a selected command signal under user control, combining said selected command signal with said selected category signal and said stored signal structure identification data thereby creating a first memory address; and wherein said step of generating subsequent appliance command signals comprises generating said subsequent appliance command signals under control of said first memory address.

3. A method as set forth in claim 1, wherein said transmitting step comprises transmitting each of said plurality of response command signals a predetermined number of times before transmitting the next of said response command signals.

4. A method as set forth in claim 3, wherein said transmitting step further comprises the step of interrupting said transmitting for a predetermined intercommand delay time before transmitting said next of said response command signals.

5. Method for adapting a remote control unit having an indicator to generate appliance command signals having a required signal structure for controlling a selected one of a plurality of appliances each responsive to a different signal structure, comprising the steps of:

setting said selected appliance to execute an observable action uppon receipt of a response-evoking signal having said required signal structure;

transmitting in sequence a plurality of response command signals each having a different signal structure until said selected appliance executes said observable action, whereby the last-transmitted one of said response command signals constitutes said response-evoking signal having said required signal structure;

storing signal structure identification data corresponding to said required signal structure of said response-evoking command, thereby creating stored signal structure identification data;

generating subsequent appliance command signals with a signal structure associated with said stored signal structure identification data;

and activating said indicator to indicate when said pluralilty of response command signals has been transmitted without execution of said observable action by said selected appliance.

6. Apparatus for adapting a remote control unit to generate appliance command signals having a required signal structure for controlling a selected one of a pluraliy of appliances each responsive to a different signal structure, said selected appliance being set to execute a predetermined action uppon receipt of a response-evoking signal having said required signal structure, comprising means for transmitting, in sequence a plurality of response command signals each having a signal structure different from the others of said response command signals, until said appliance executes said observable action in response to said response-evoking signal;

means for storing signal structure identification data corresponding to said response-evoking signal;

means for generating subsequent appliance command signals at least in part in dependence on said stored signal structure identification data;

wherein each of said appliances belongs in one of a multiplicity of categories;

further comprising second user operable selector means for generating a selected category signal signifying a selected one of of said categories; and where in said subsequent appliance command signal generating means further operates at least in part in dependence upon said selected category signal.

7. Apparatus as set forth in claim 6 further comprising means for generating an indentify command upon user activation; and wherein said transmitting means transmits said plurality of response command signals in response to said "identify" command 8. Apparatus as set forth in claim 7 wherein said "identify" command generating means comprises first user operable selector means for generating a first selector signal signifying a user selected one of a plurality of available operator commands, said plurality of available operator commands including said "identify" command.

9. Apparatus as set forth in claim 8, wherein said first user operable selector means comprises a keyboard having an "identify key"; and wherein said first user operable selector means generates said "identify" command during depression of said identify key and a "terminate" command terminating said transmission of said plurality of response command signals upon release of said identify key 10. Apparatus as set forth in claim 6, wherein said remote control unit further comprises first memory means for storing a plurality of product code tables, each at a first memory address, one of said tables including said response evoking signal; and wherein said subsequent appliance command signal generating means comprises means for generating a first memory address at least in part in dependence on said stored signal structure identification data and said selected category signal.

11. Apparatus as set forth in claim 10, wherein said first memory means comprises an electrically programmable read only memory.

12. Apparatus as set forth in claim 6, wherein said transmitting means transmits infrared command signals.

13. Apparatus as set forth in claim 6, further comprising a microprocessor having a read only memory having programs constituting in part said transmitting means and said subsequent appliance command signal generating means.

* * * * *